United States Patent [19]
Broadley et al.

[11] 3,841,586
[45] Oct. 15, 1974

[54] ROTOR SWASHPLATE ASSEMBLY

[75] Inventors: William D. Broadley, Lansdowne; Kenneth I. Grina, Media; Carlton H. Schaub, Newtown Square, all of Pa.

[73] Assignee: The Boeing Company, Seattle, Wash.

[22] Filed: Apr. 26, 1973

[21] Appl. No.: 354,726

[52] U.S. Cl................... 244/17.25, 74/60, 74/479, 416/114
[51] Int. Cl. ...................... B64c 27/74, B64c 27/76
[58] Field of Search ........ 74/479, 60; 416/114, 112, 416/130; 244/17.11, 17.19, 17.21, 17.23, 17.25, 17.27

[56] References Cited
UNITED STATES PATENTS
| | | | |
|---|---|---|---|
| 3,134,444 | 5/1964 | Egerton et al. | 416/114 X |
| 3,217,811 | 11/1965 | Hibyan et al. | 244/17.27 X |
| 3,322,200 | 5/1967 | Tresch | 416/114 UX |

Primary Examiner—Trygve M. Blix
Assistant Examiner—Paul E. Sauberer
Attorney, Agent, or Firm—Robert S. Lipton; Joseph M. Corr

[57] ABSTRACT

A rotor swashplate assembly wherein the inner rotating ring of the swashplate is connected to the rotating rotor shaft by four scissor links arranged in two pairs such that each pair is 90° to the other. Each of the links of one pair of scissor links is connected to the rotating rotor shaft through the use of an elastomeric bearing. The elastomeric bearing permits the scissor links to angularly deflect in the plane of rotation with respect to the rotor shaft thereby permitting the swashplate to tilt. The scissor link connection transmits torque to the rotating ring of the swashplate from the rotor shaft, centers it about the rotor shaft, and allows it to tilt and move vertically as required for control actuation.

9 Claims, 6 Drawing Figures

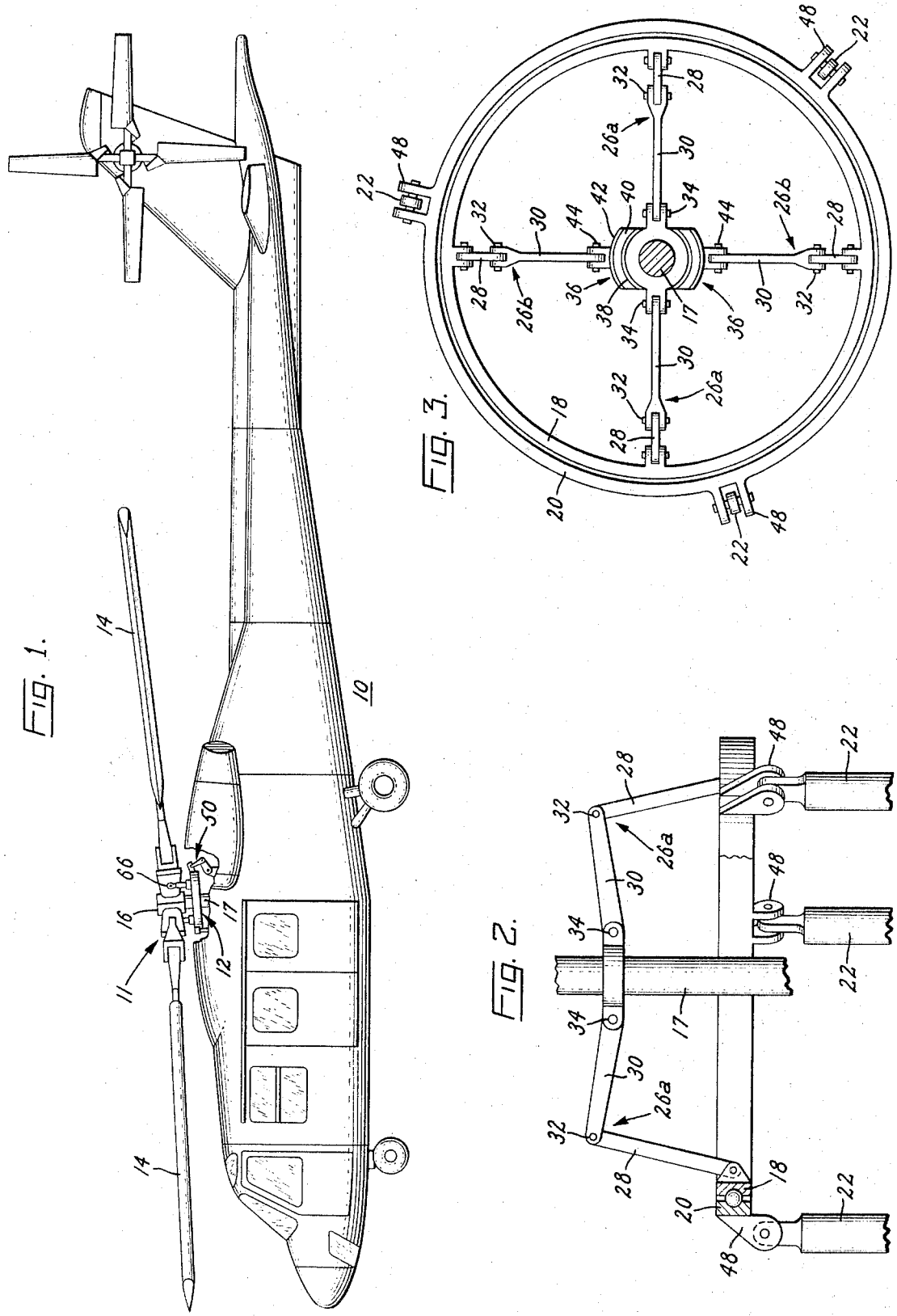

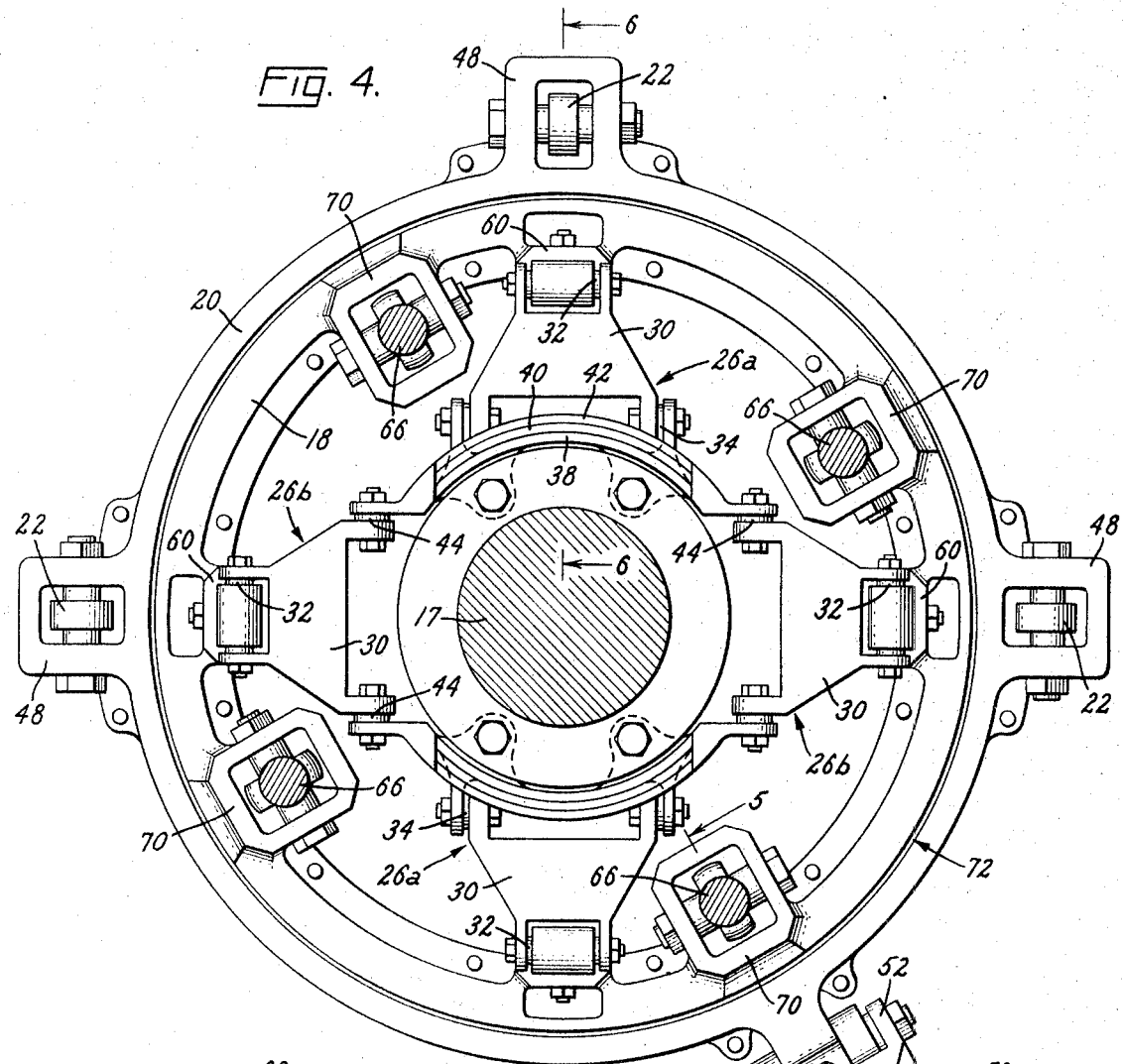
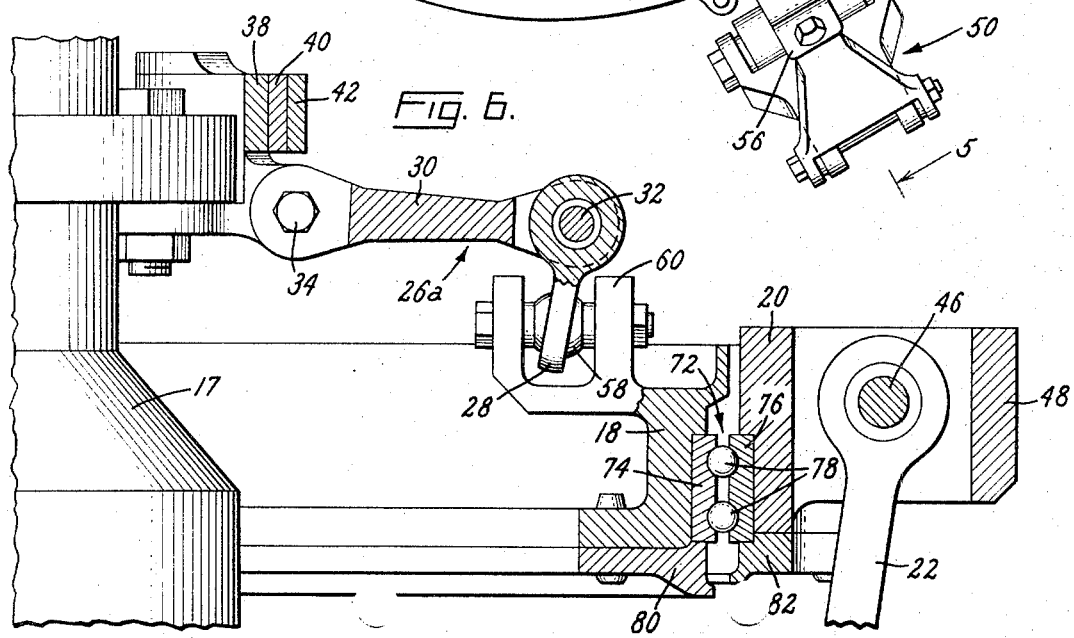

ROTOR SWASHPLATE ASSEMBLY

BACKGROUND OF THE INVENTION

This invention relates generally to swashplates for use with the control system of rotorcraft rotors, and in particular helicopter rotors.

Control of a helicopter may be effected by varying the pitch of the rotor blades as the rotor rotates and by varying the pitch of the blades an equal amount. This is known respectively as cyclic and collective pitch. The aircraft control system consists of a rotating portion which rotates with the rotor hub and a non-rotating portion which is actuated by the pilot or automatic pilot.

The swashplate of a rotor control system is the device which transfers the motion of the non-rotating control members to the rotating members. It is concentrically mounted about the rotor shaft and is either connected to the rotor hub or to the rotor shaft. The swashplate assembly includes the swashplate and the members associated with connecting it to the rotating portion of the rotor system. Being the interface between the rotating and non-rotating portions of the control system, the swashplate in turn includes two concentrically oriented rings connected by a series of bearings so that one ring may rotate with respect to the other.

In operation one ring of the swashplate is non-rotatable while the remaining ring rotates with the rotor of the aircraft. The pitch arms of the rotor blades are connected to the rotating ring of the swashplate by pitch links. If the swashplate is raised or lowered vertically the change in pitch angle of each of the rotor blades is the same thus effecting collective pitch. When the swashplate is tilted, every point on the rotating ring of the swashplate is raised and lowered vertically in a cyclic manner as the rotor rotates. This results in the pitch angle of a particular rotor blade changing as the rotor rotates thus introducing cyclic pitch. It may therefore be seen that it is a requirement that the swashplate of a rotor be capable of moving vertically, i.e., in a direction parallel to the rotor shaft and be able to tilt with respect to the plane of rotation.

There are many prior art methods which have been used to connect the swashplate to the rotor shaft to provide these degrees of freedom. One common approach has been to mount a ball concentrically about the rotor shaft so that it slides with respect thereto. The swashplate is then universally mounted to the ball so that tilting motion may take place about the ball. The requirement that the swashplate tilt and move vertically with respect to the rotor shaft is thus achieved. Another, but similar approach has been to use a gimbal mechanism instead of ball just described. The gimbal is mounted on a sleeve which is concentrically mounted on the rotor shaft. The gimbal provides the universal motion while the sleeve permits motion of the gimbal in the vertical direction.

Although the prior art methods of connecting the swashplate to the rotor shaft have performed satisfactorily, there have been some disadvantages. The ball or gimbal and sliding mechanism require rigid manufacturing tolerances thereby making them costly to manufacture. The construction results in comparatively high friction loads thus absorbing needed power from the swashplate actuator. The approach lacks redundancy so that safety of flight may be lost in the event a critical part fails structurally. The method of the prior art is particularly vulnerable when used in military aircraft where an impact on the swashplate support structure by a high velocity projectile such as a bullet will cause failure of the entire system resulting in loss of control of the aircraft.

The sliding ball method of mounting the swashplate to the rotor shaft has other disadvantages. If the ball has to be replaced it is necessary to remove the rotor blades and rotor hub from the aircraft in order to remove the ball from the rotor shaft. The rotor does not have to be removed to replace components of the swashplate support structure of the present invention. For both aerodynamic and space availability reasons the ball method of swashplate mounting required too much space. The present invention accomplishes the desired result while using less space.

SUMMARY OF THE INVENTION

The present invention overcomes the disadvantages of the prior art method by connecting the swashplate to the rotor through the use of four scissor links. The links are preferably spaced such that there is 90° between adjacent links. One pair of opposing scissor links is mounted to the rotor in such a manner that small angular deflections in the plane of rotation may take place.

It is therefore an object of the invention to provide a new and improved means for connecting a swashplate to a rotor or rotor shaft.

It is an object of the invention to provide a means for connecting a swashplate to a rotor so as to provide increased safety in the event of a structural failure.

It is an object of the invention to provide a means of connecting a swashplate to a rotor which can be repaired or replaced without removing the rotor.

It is an additional object of the invention to provide an improved means for connection a swashplate to a rotor so that minimal power losses are incurred in the operation of the rotor.

It is an object of the invention to provide a means for connecting a swashplate to a rotor which occupies minimal space.

A still further object is to provide a new and improved means of connecting a swashplate to a rotor so as to decrease the system's vulnerability to a ballistic impact.

It is an additional object of the invention to provide a new and improved means for connecting a swashplate to a rotor through the use of scissor links so as to provide translational and tilting motion capability of the swashplate with respect to the rotor.

Other further objectives and advantages will be described in the description which follows, taken together with the accompanying drawings.

BRIEF DESCRIPTION OF THE DRAWINGS

In the drawings in which like numerals refer to like parts:

FIG. 1 is a perspective view of a helicopter embodying the invention;

FIG. 2 is a side schematic view of the invention;

FIG. 3 is a top schematic view of the invention as shown in FIG. 2, taken along line 2—2;

FIG. 4 is a detailed perspective view of the preferred embodiment of the invention;

FIG. 6 is a section view of a portion of the preferred embodiment shown in FIG. 4 taken along line 6—6.

DESCRIPTION OF THE PREFERRED EMBODIMENT

Figure 5:
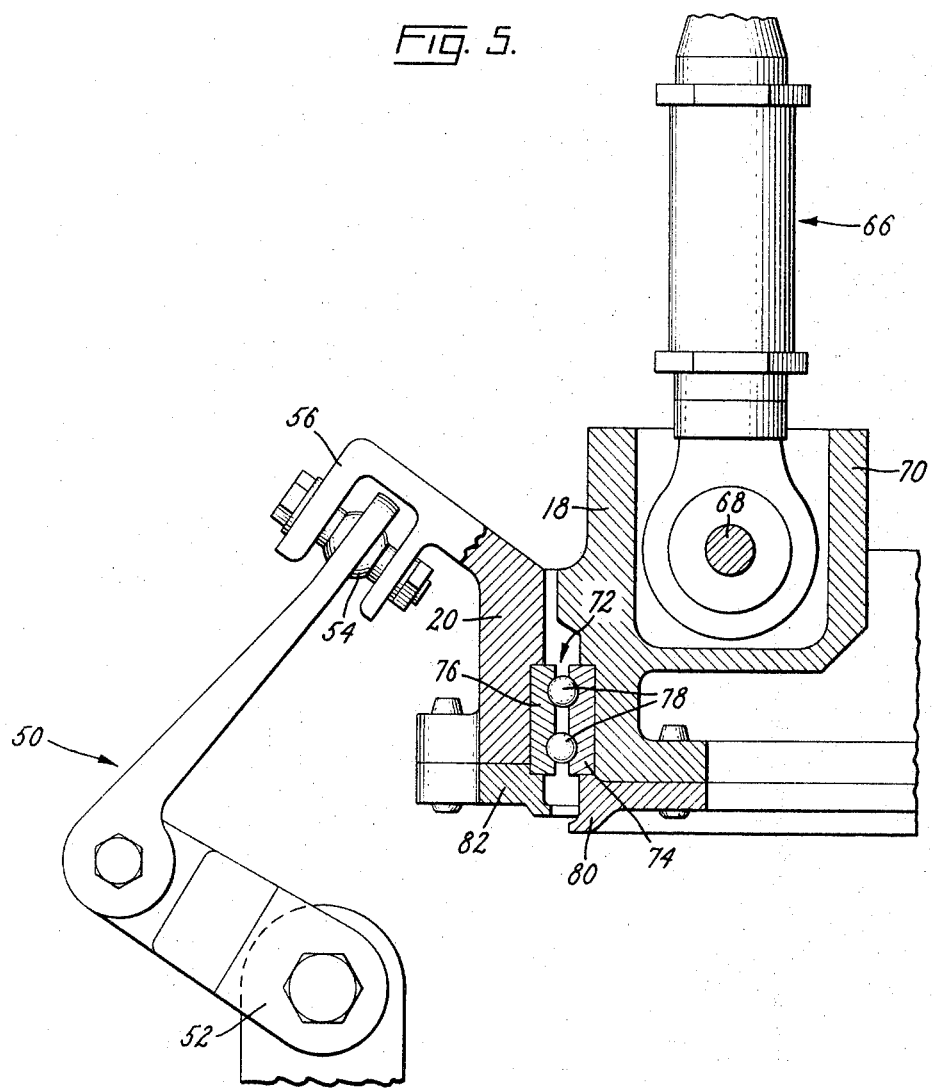
FIG. 5 is a section view of a portion of the preferred embodiment shown in FIG. 4 taken along line 4—4.

This invention relates generally to the control system of rotorcraft and in particular the control system of helicopters. In FIG. 1 a helicopter 10 is shown which incorporates the swashplate assembly 12 of the present invention. The helicopter has a rotor 11 which includes rotor blades 14 and rotor hub 16. The hub is mounted on a rotor shaft 17 which is in turn connected to a drive system including an engine and transmission.

The swashplate assembly 12 is a primary link in the rotor control path which originates at the pilot's control stick or automatic pilot and terminates in the pitch angle of the rotor blades 14 of the rotor 11. The swashplate assembly is the interface between the rotating and non-rotating components of the control system.

A schematic view of the swashplate assembly 12 of the present invention is shown in FIGS. 2 and 3. A detailed construction of the preferred embodiment is shown in FIG. 4. The swashplate assembly 12 has an inner ring 18 and outer ring 20. The rings are connected to one another in any suitable manner so as to permit one to rotate with respect to the other. In operation with a rotor one of the rings remains non-rotating with respect to the aircraft fuselage while the other ring rotates with the rotor. It is optional as to which of the two rings remains non-rotating. For purposes of the present disclosure and the preferred embodiment the outer ring has been selected as the non-rotating ring.

The outer ring 20 is connected to non-rotating aircraft structure by three (3) actuators 22. Each of the actuators are universally mounted to both the aircraft and to the outer ring 20. The actuators change length in response to the pilot's movements of the cockpit controls. When the change in length of each of the actuators is the same, the swashplate assembly 12 moves vertically without tilting. This changes the pitch angle of each of the rotor blades an equal amount, thus introducing collective pitch. Tilting of the swashplate, which introduces cyclic pitch, is accomplished by differentially varying the lengths of the actuators. Any one of a number of types of actuators known in the art may be used for this purpose. A hydraulic actuator is used in the construction of the preferred embodiment.

The inner rotating ring 18 is connected to the rotor shaft 17 of the rotor 11 through the use of four (4) scissor links 26 which also form a portion of the swashplate assembly 12. As connected, these links permit the swashplate to translate vertically, i.e., move parallel to the rotor shaft, and to tilt while maintaining the swashplate assembly centered with respect to the rotor shaft. The inner ring rotates with the rotor as a direct result of the torque transmitted from the rotor shaft 17 to the inner ring 18 by the links 26. Each of the four scissor links 26 consist of two links 28 and 30 connected together by a hinge 32. As mounted the hinge permits the scissor link to flex thus permitting motions in the vertical direction.

The four (4) scissor links 26 may be viewed as two pairs of opposing links 26a and 26b. One pair of opposing links 26a are connected to the rotor shaft 24 by hinges 34. The hinge is made up of the link 30 being connected to lugs on the rotor shaft 17 by nut and bolt assemblies. Vertical motion of the swashplate is permitted due to rotation of the links 30 about the hinge 34.

Each of the links of the remaining pair of opposing links 26b is connected to the rotor shaft in such a manner so as to permit the links of that pair to angularly deflect in the plane of rotation. In addition, each of the links of this pair of opposing links are pivotally connected to the rotor shaft by a hinge 44 so that the links may pivot about the axis of the hinge pin. As will be understood by those skilled in the art the ends of the four links may be connected to the rotor instead of the rotor shaft without departing from the present invention. The choice will be a function of the design criteria of the particular aircraft to which the invention is being applied.

This pair of opposing scissor links 26b are pivotally connected to the rotor shaft 17 by elastomeric bearing assemblies 36. Each of the bearing assemblies consist of an inner race 38, an elastomeric bearing 40 and an outer race 42. The end of link 30 of this pair of scissor links 26 is pivotally connected to the outer race 42 of the elastomeric bearing assembly by hinge 44. The inner race 38 of the bearing assembly is rigidly connected to the rotor shaft by means not shown for purposes of clarity, but is shown in FIG. 4. Thus, this pair of links is permitted to fold in the vertical direction while at the same time being subjected to small angular deflections in the plane of rotation.

The remaining ends of each of the four scissor links 26 are mounted universally to the ring 18 of the swashplate assembly 12.

The angular deflections provided by the elastomeric bearing assemblies 36 are necessary in only one pair of opposing scissor links. This angle change is attributable to and is a direct function of the tilting motion of the swashplate assembly. The tilting motion would be impossible with the scissor link type support without provision for such an angle change. It may thus be seen from the schematic views of FIGS. 2 and 3 that a swashplate assembly 12 is provided by the present invention which uses a simple scissor link support system which provides vertical translational motion and tilting motion in response to pilot inputs. The pitch links which connect the inner ring to the rotor blades will be discussed hereafter and are not shown in FIGS. 2 and 3 for purposes of clarity.

Refer now to FIG. 4 where the preferred embodiment of the invention is depicted in a perspective view. FIG. 5 is a section view of that portion of the preferred embodiment shown in FIG. 4 taken along line 5—5 and FIG. 6 is a section view taken along line 6—6.

Each of the three actuators 22 has mounted at either end a spherical bearing 46. The actuators are connected to the outer ring 20 by connecting the spherical bearing 46 to a clevis 48 by a nut and bolt assembly. Although not shown in FIG. 4 the remaining ends of the acutator 22 are connected to the aircraft structure by attaching a spherical bearing 46 to the aircraft. It is thus easily understood that the spherical bearings 46 provide a universal mounting of the actuators with respect to the swashplate assembly 12 and to the helicopter 10.

If no additional support were provided for the outer ring 20, frictional forces generated by rotation of the inner ring 18 and swashplate in plane loads caused by actuator tilt would cause some rotation of the outer ring 20. In order to preclude such rotation scissor link 50 is provided as is shown in FIGS. 4 and 5. One end of the scissor link 50 is hinged to the aircraft through the use of a clevis 52 and a nut and bolt assembly. A spherical bearing 54 is mounted at the opposite end of the scissor link 50. The spherical bearing 54 is mounted to the outer ring 20 by a nut and bolt assembly and clevis 56 thus universally mounting the link to the outer ring 20. As mounted, the scissor link 50 will prevent the outer ring 20 from rotating yet permit it to tilt and to translate vertically.

The four scissor links 26 are universally mounted to the inner ring 18 through the use of spherical bearings 58. The spherical bearings 58 are each connected to a clevis 60 on the inner ring 18 through the use of nut and bolt assemblies. In this manner the links 26 are attached to the inner ring 18 such that the angle between link 28 and ring 18 may vary thus permitting the ring 18 to tilt with respect to the plane of rotation.

The remaining ends of scissor links 26 of the preferred embodiment are connected functionally in the same manner as depicted in the schematic FIGS. 2 and 3, however, the structural arrangement is different. As is shown in FIGS. 4 and 6 two elastomeric bearings 40 having an inner race 38 and an outer race 42 are provided. The inner race 38 of each bearing is rigidly secured to the rotorshaft 17 by nut and bolt assemblies which secure lugs on the inner race to a collar or flanges formed on the rotorshaft. The mid section of each outer race 42 is rigidly secured to one of the elastomeric bearings 40. Each outer race 42 is semicircular in shape. The angularly deflectable pair of scissor links 26b are connected to each of the outer races 42. Pivotal motion is provided between these links 26b and the outer race 42 by a hinge 44.

The remaining pair of scissor links 26a are effectively connected to the rotor shaft as they are pivotally connected to the inner race 38 of the elastomeric bearing assembly as may be seen in FIG. 6. This pair of scissor links is connected to the inner race of the bearing instead of to the rotorshaft 17 as shown in the schematic drawings because the number of connective points or flanges required on the rotorshaft is minimized. By reducing the number of attachment points required on the rotorshaft weight is eliminated as the number of lugs required is reduced.

Referring now to FIG. 5 where a partial section view taken along line 5—5 of FIG. 4 is shown. The inner ring 18 is shown rotatably connected to the outer ring 20 through the use of bearing assembly 72. The independently manufactured bearing assembly 72 is comprised of an inner race 74 and an outer race 76 separated by ball bearings 78. The bearing assembly 72 is secured between the inner ring 18 and the outer ring 20 through the use of securing plates 80 and 82 which are connected to the inner and outer rings respectively by nut and bolt assemblies.

The pitch links 66 transfer motion of the swashplate assembly 12 to the rotor blades 14. A spherical bearing 68 is mounted to the inner ring 18 through the use of clevis 70 and nut and bolt assemblies. The same type of connection is provided at the opposite end of the pitch link 66 to connect it to the rotor blade. Thus the pitch link is universally mounted both to the inner ring 18 and to the rotor blade 14.

The geometry of the swashplate support of the present invention provides inherent centering of the swashplate assembly with respect to the rotorshaft. However, some off-centering does occur due to deflections of the links 26 resulting from high structural loads.

In the preferred embodiment of the invention the effect of these deflections are minimized by making link 28 as short as possible in each of the scissor links 26. As long as the swashplate has a tilting capability in combination with this type of support there will be some displacement of the center of the swashplate due to structural deflections.

During operation of the helicopter 10 movement of cockpit controls by the pilot causes the actuators 22 to extend or contract. The three actuators 22 will extend or contract by equal or differential amounts depending upon the input of the pilot. The extension or contraction of the actuators 22 result in the non-rotating outer ring 20 of the swashplate assembly 12 to be raised or lowered in a vertical direction. This in turn causes the inner ring 18 to be raised or lowered by the same amount. The vertical and tilting motion of the inner ring 18 is permitted by the scissor links 26 in combination with the elastomeric bearing 40. The motions of the inner ring are passed to the rotor blades 14 by pitch links 66.

It may be seen that motions of the non-rotating portion of the control system are transferred to the rotating portion of the control system in a simple and efficient manner. Vertical and tilting motions of the inner ring of the swashplate assembly with respect to the rotating rotor are permitted while at the same time maintaining the swashplate assembly in a centered position with respect to the rotor shaft. This is accomplished in a simple direct manner which saves weight and utilizes components which require less maintenance and less machining detail as compared to the prior art methods of accomplishing the same objective.

The swashplate assembly of the present invention will remain operative even if one of the four links 26 fails structurally or is severed by ballistic impact. This result is achieved as three links 26 are sufficient to maintain the swashplate centered with respect to the axis of rotation. In this manner reliability and decreased vulnerability are achieved.

It will be readily apparent to those skilled in the art that links 26 may be repaired or replaced without removing the aircraft rotor. This lowers the maintenance costs of the aircraft as in the rotorcraft of the prior art the slider mechanism is concentrically mounted about the rotor shaft and therefore requires the removal of the rotor before it can be replaced.

In accordance with the preceding description and drawings of the swashplate assembly of the present invention it is to be understood that other embodiments may be made without departing from the spirit thereof.

What is claimed is:

1. In a rotorcraft having a rotatable rotor assembly including a rotor connected to a rotorshaft; a control system including a non-rotating portion connected to the aircraft and a rotating portion connected to the rotor assembly; and a swashplate assembly interface between the rotating and non-rotating portions of the control system which conprises: a swashplate including a rotatable ring, a non-rotatable ring and means to permit rotation connected to said rotatable ring and to said non-rotatable ring; a first pair of opposed scissor links, one end of each link being operably connected to said rotating ring, the other end of each link being operably connected to the rotor assembly; a second pair of opposed scissor links, one end of each link being operably connected to said rotating ring so that each link is displaced approximately 90° from each of the links of said first pair of scissor links, the other end of each link of said second pair of scissor links being operably connected to the rotor assembly means permitting said links to angularly deflect with respect to the rotor assembly in the plane of rotation.

2. The swashplate assembly of claim 1 wherein each of the links of said second pair of scissor links is operably connected to said rotor assembly by a resilient means, and wherein said resilient means is connected to said rotor assembly.

3. The swashplate assembly of claim 2 wherein each of the resilient means is an elastomeric bearing having an inner race and an outer race, one end of each link of said second pair of scissor links is operably connected to said outer race and wherein each of said inner races is connected to the rotor.

4. The swashplate assembly of claim 3 wherein each of the links of said first pair of scissor links is connected to the rotorshaft of the rotor assembly, and wherein each of said inner races is connected to the rotorshaft of the rotor assembly.

5. The swashplate assembly of claim 4 wherein each link of said first and second pairs of scissor links is connected to said rotating ring by a universal joint.

6. The swashplate assembly of claim 5 wherein said nonrotating ring is concentrically mounted about said rotating ring.

7. The swashplate assembly of claim 3 wherein the operable connection of each of said links of said first pair of scissor links to the rotorshaft is a pivotal connection to permit said links to rotate in a plane perpendicular to the plane of rotation of the rotorshaft.

8. The swashplate assembly of claim 1 having first and second elastomeric bearings each bearing having an inner race and an outer race wherein one end of each link of said second pair of scissor links is operably connected to said outer race of said first elastomeric bearing and to said outer race of said second elastomeric bearing, and wherein each of said inner races is rigidly connected to the rotorshaft, and wherein each link of said first pair of scissor links is operably connected to an inner race.

9. The swashplate of claim 8 wherein the operable connection of each link of said first pair of scissor links to said inner face is a pivotal connection to permit said links to rotate in a plane perpendicular to the plane of rotation of the rotorshaft and wherein the operable connection of each link of said second pair of scissor links to said outer race is a pivotal connection to permit said links to rotate in a plane perpendicular to the plane of rotation of the rotorshaft.

* * * * *